United States Patent [19]

Kreh et al.

[11] Patent Number: 5,183,573

[45] Date of Patent: Feb. 2, 1993

[54] MULTIPURPOSE SCALE PREVENTER/REMOVER

[75] Inventors: Robert P. Kreh, Jessup; Wayne L. Henry, Gaithersburg, both of Md.

[73] Assignee: W. R. Grace & Co.-Conn., New York, N.Y.

[21] Appl. No.: 733,527

[22] Filed: Jul. 22, 1991

[51] Int. Cl.$^5$ ................................ C02F 5/12
[52] U.S. Cl. ........................ 210/697; 210/698; 210/699; 134/3; 252/82; 252/180; 252/181; 422/16
[58] Field of Search ............ 134/3; 252/82, 180, 252/181; 210/698–701, 697; 422/16

[56] References Cited

U.S. PATENT DOCUMENTS

| | | | |
|---|---|---|---|
| 3,527,609 | 9/1970 | Vinso | 134/3 |
| 3,549,538 | 12/1970 | Jacklin | 252/180 |
| 3,975,281 | 8/1976 | Tate et al. | 250/180 |
| 4,221,674 | 9/1980 | Vander Mey | 252/141 |
| 4,604,233 | 8/1986 | Rootsaert et al. | 134/3 |
| 4,721,532 | 1/1988 | Kuhn et al. | 134/3 |
| 4,734,203 | 3/1988 | Lin et al. | 210/698 |

OTHER PUBLICATIONS

Schweizerische Chemische Gesellschaft, "Der Phenolatsauerstoff als Koordinationspartner", Schwarzenbach et al.

J. Am. Chem. Soc. "Iron-Oxo Aggregates, Crystal Structures and Solution Characterization of 2-Hydroxy-1,3-xylylenediaminetetraacetic Acid Complexes", Murch et al. (1987).

*Primary Examiner*—Peter Hruskoci
*Attorney, Agent, or Firm*—James P. Barr

[57] ABSTRACT

A process for preventing or removing calcium and rust scale deposits from surfaces which are in contact with aqueous systems comprising adding to the aqueous system 3,5-bis(di-N,N-(carboxymethyl)aminomethyl)-4-hydroxybenzenesulfonic acid in an amount effective to remove the scale and rust deposits.

7 Claims, No Drawings

MULTIPURPOSE SCALE PREVENTER/REMOVER

FIELD OF THE INVENTION

This invention relates to a method of preventing and/or removing calcium and/or rust deposits from surfaces in contact with aqueous systems and more specifically to a method of treating an aqueous system with 3,5-bis(di-N,N-(carboxymethyl)aminomethyl)-4-hydroxybenzenesulfonic acid to remove scale and/or rust deposits from the surfaces of the aqueous systems.

BACKGROUND OF THE INVENTION

It is known that aqueous systems, particularly industrial aqueous systems such as boiler systems, cooling tower systems, heat exchanger systems, desalinization systems, and the like, are subject to the formation of deposits on the internal surfaces which are in contact with the circulating water. Depending upon the nature of the deposit, various approaches have been taken to either control or inhibit the formation of these deposits or alternatively to remove the already formed deposits. For example chelants are known for their ability to complex with many cations including hardness and heavy metal cations and thereby prevent their deposition. Chelants function by essentially "locking" the metal into a soluble organic ring structure. When chelants are applied in combination with a dispersant, the treated system often results in clean waterside surfaces. However, chelants tend to be somewhat specific with respect to which cations they will complex with. Anionic chelants have reactive sites that attract coordination cites of cations; coordination sites are areas on the ion that are receptive to chemical bonding. Thus for example, iron has six coordination sites, as does the chelant EDTA. Thus, iron ions combine with the EDTA and since all of the coordination sites on the iron ion are chemically bonded by the EDTA, a stable metal chelant is formed. However, nitrilotriacetic acid (NTA), which is another commonly used chelant, has only four coordination sites, and thus NTA does not form as stable a metal chelant complex as does EDTA. Citric acid is a moderately strong Ca(II) chelant, but a weak ferric chelant.

U.S. Pat. No. 4,721,532 discloses certain alkylene amine carboxyl polyacids (AACPs) which are useful for removing iron fouling from heat transfer surfaces of cooling water systems. Particularly preferred compounds disclosed therein are N,N'-ethylene-bis-((2-hydroxy-4-methylphenyl)glycine) (EDDHMA) and N,N-di-(2-hydroxy-5-sulfonic acid benzyl) glycine, (Hamplex DPS). However, while these compounds have been found to be useful for removing iron fouling, they are less effective in removing rust scale containing both iron and calcium.

It has now been discovered that 3,5-bis(di-N,N- (carboxymethyl)aminomethyl)-4-hydroxybenzenesulfonic acid provides surprising effectiveness in chelating not only iron but also effectively chelating calcium ions in aqueous solutions and is thus effective at preventing and removing both calcium and rust scale deposits.

SUMMARY OF THE INVENTION

It is an object of this invention to provide a method of preventing and removing calcium and rust scale deposits in aqueous systems.

It is another object of this invention to provide a chelant with the ability to effectively complex with both iron and calcium ions.

In accordance with the present invention, there has been provided a method of treating an aqueous system to remove rust scale deposits which comprises adding to the aqueous system, 3,5-bis(di-N,N-(carboxymethyl)-aminomethyl)-4-hydroxybenzenesulfonic acid in an amount effective to remove the rust scale deposits.

DETAILED DESCRIPTION

The subject invention relates to the use of a novel multipurpose scale inhibitor and/or remover for controlling rust scale deposits on surfaces which are in contact with aqueous systems. More specifically, the process of this invention comprises adding 3,5-bis(di-N,N-(carboxymethyl)aminomethyl)-4-hydroxybenzenesulfonic acid or its water soluble salts to an aqueous system in an amount effective to inhibit or remove the rust scale deposits contained therein. 3,5-bis(di-N,N-(carboxymethyl)aminomethyl)-4-hydroxybenzenesulfonic acid can be represented by the following formula:

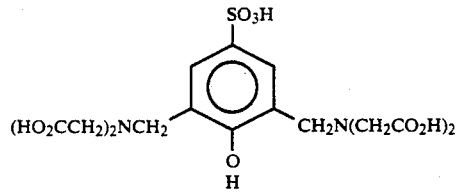

The preparation of 3,5-bis(di-N,N-(carboxymethyl) aminomethyl)-4-hydroxybenzenesulfonic acid (hereinafter Diquest) is disclosed in *Helv. Chem. Acta*, 35, 1785 (1952) which is hereby incorporated by reference in its entirety. The water soluble salts of Diquest are readily prepared by neutralizing the sulfonic acid group, as well as the carboxyl groups, with at least a stoichmetric amount of a base or salt that contains the desired cation. Bases and salts of acids such as those containing an alkali metal, alkaline earth metal, zinc, aluminum, molybdenum, ammonia, and amines such as lower alkyl amines are especially suitable, with sodium and potassium salts being preferred. It should be noted however, that all of the acidic hydrogens of the Diquest compound need not be replaced nor is it necessary for the cation to be the same for each acid hydrogen replaced. Thus the cation may be any of $NH_4^+$, $H^+$, $Na^+$, $K^+$, etc., or mixtures thereof.

Other bases or salts which can be reacted with the sulfonic acid group to produce the derivative salt compounds of the instant invention include inorganic alkali metal salts, oxides and hydroxides such as NaOH, $Na_2O$, $Na_2CO_3$, KOH, $K_2O$, $K_2CO_3$, LiOH, $Li_2CO_3$, $Ca(OH)_2$, $CaCO_3$, as well as other inorganic metal salts, and hydrox-ides such as $Al(OH)_3$ and $ZnCO_3$ and amines, particularly low molecular weight amines (i.e. amines having a molecular weight below about 300), and more particularly the alkyl amines, alkylene amines and alkanol amines such as ethylamine, diethylamine, propylamine, propylene diamine, hexylamine, 2-(ethyl)-hexylamine, N-butylethanol amine, triethanolamine and the like.

The water treatment additives of the present invention have been found to be effective for inhibiting and removing scale deposits from surfaces which are in contact with aqueous systems, and have been found to be particularly effective in removing rust scale deposits containing calcium and iron deposits. These deposits include calcium carbonate, calcium silicate, and/or iron oxide which form on the metallic structures of industrial water systems. It is believed that the rust scale inhibitors of this invention accelerate corrosion while simultaneously chelating the oxidized iron and calcium which is formed by the accelerated corrosion activity. In this manner, the additives of this invention cause the removal of rust scale by weakening the surface attachment of the rust scale deposit. Accordingly, it should be possible to remove any scale deposit regardless of its composition, since the scale deposit is removed by surface detachment rather than by dissolution.

In accordance with this invention, the formation of scale may be inhibited, or rust scale deposits may be removed, by adding to the system 3,5-bis(di-N,N- (carboxymethyl)aminomethyl)-4-hydroxybenzenesulfonic acid, or its water soluble salts in an amount effective to inhibit the formation of scale or to remove scale deposits which may already be present in the system. The precise dosage of the multipurpose scale remover of this invention depends, to some extent, on the nature of the aqueous system in which it is to be incorporated and the degree of protection desired, as well as the degree of rust scale which may be deposited in the system. In general, however, the concentration maintained in the system water can be from about 1 ppm to about 10,000 ppm. Within this range, generally low dosages of about 5-1000 ppm are normally preferred. The exact dosage amount required with respect to a particular aqueous system can be readily determined in conventional manners which are known to those of ordinary skill in the art.

The aqueous systems which may be advantageously treated in accordance with the method of this invention include, but are not limited to cooling water systems such as e.g. cooling towers, as well as to desalinization units, gas scrubbers, boiler systems, recirculating water systems and the like. The multipurpose scale remover of this invention may be added to the system by any convenient mode, such as by first forming a concentrated solution of the Diquest or its water-soluble salts, with water (preferably containing between 1 and 50 total weight percent of the phenol sulfonic acid complex) and then feeding the concentrated solution to the aqueous system at some convenient point. In many instances the compounds may be added to the make-up or feed water lines through which water enters the system.

The multipurpose scale removers of this invention are also effective when used in aqueous systems which are operated at high temperatures and pressures such as, for example in steam generating boilers. The multipurpose scale removers have also been found to remain soluble in water containing substantial hardness and alkalinity. The present invention is especially useful in the treatment of cooling water systems, which operate at temperatures of about 60° F. to 200° F., particularly open recirculating cooling water systems which operate at temperatures of from about 80° F. to 150° F.

The multipurpose scale remover of the instant invention may be used as the sole rust scale inhibitor/remover, or may be used advantageously with other known water treating agents which include, but are not limited to biocides, corrosion inhibitors, phosphates, phosphonates, yellow metal corrosion inhibitors, pH regulators, other scale inhibitors, dispersants, oxygen scavengers and the like, or mixtures thereof.

Without further elaboration, it is believed that one skilled in the art, using the preceding detailed description can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

A mild steel coupon was corroded in a salt spray (3% NaCl) at 25° C. for 24 hours which resulted in the formation of 110 mg of a rust deposit on the surface of the coupon. The coupon was then rinsed with water and stirred for 24 hours at 54° C. in an aqueous solution having a pH between 8.5 and 9.0 and containing 2500 ppm 3,5-bis(di-N,N-(carboxymethyl)aminomethyl)-4-hydroxybenzenesulfonic acid, 99 ppm $CaSO_4$, 13 ppm $CaCl_2$, 55 ppm $MgSO_4$ and 176 ppm $NaHCO_3$. The rust deposit was completely removed.

EXAMPLE 2

For purposes of comparison, the procedure according to Example 1 was repeated except the 3,5-bis(di-N,N- (carboxymethyl)aminomethyl)-4-hydroxybenzenesulfonic acid was omitted. The rust deposit was not removed.

EXAMPLE 3

Test water was prepared to contain 99 ppm $CaSO_4$, 13 ppm $CaCl_2$, 55 ppm MgSO and 176 ppm $NaHCO_3$. To this water was added 5,000 ppm of 3,5-bis(di-N,N-(carboxymethyl)- aminomethyl)-4-hydroxybenzenesulfonic acid and the pH was adjusted to 8.5. Calcium carbonate was added at 1,300 ppm. After stirring at 54° C. for 17 hours, all of the $CaCO_3$ had dissolved.

EXAMPLE 4

Example 3 was repeated without the addition of the subject chelant. None of the $CaCO_3$ dissolved.

EXAMPLE 5

Example 4 was repeated with the addition of citric acid instead of the subject chelant. A concentration of 9,000 ppm of citric acid was required to completely dissolve the $CaCO_3$.

EXAMPLE 6

Test water was prepared as in Example 4. To this water was added 10 ppm of the subject chelant and the pH was adjusted to 6.0. While stirring 100 milliliters (ml) of this solution, a solution of 2 mg $FeCl_3 \cdot 6H_2O$ in 1.0 ml of 0.03 molar HCl(ag) was added. The pH was adjusted to 8.0 and the solution was stirred at 54° C. for 17 hours. A sample was filtered through a 0.2 micron membrane and analyzed for soluble iron. A value of 0.86 ppm was found. This example demonstrates the prevention of iron oxide/hydroxide precipitation (rust scale).

EXAMPLE 7

For purposes of comparison, the procedure of Example 7 was repeated without the addition of the subject chelant. The value obtained for soluble iron was <0.01 ppm.

We claim:

1. A process for preventing or removing calcium and rust scale deposits from surfaces which are in contact with an aqueous system having a pH in the range 8 to 9 comprising adding to the aqueous system 3,5-bis(di-N,N-(carboxymethyl)aminomethyl)-4-hydroxybenzenesulfonic acid in an amount effective to remove the scale and rust deposits.

2. A process according to claim 1 wherein the effective amount is in the range 1 ppm to 10,000 ppm.

3. A process according to claim 1 wherein the aqueous system is a boiler system, a cooling tower system, a heat exchanger system, or a desalinization system.

4. A process according to claim 1 wherein the 3,5-bis(di-N,N-(carboxymethyl)aminomethyl)-4-hydroxybenzenesulfonic acid is added to the system in combination with other water treatment agents selected from the group consisting of corrosion inhibitors, biocides, phosphates, phosphonates, pH regulators, dispersants, oxygen scavengers, and mixtures thereof.

5. A process according to claim 1 wherein the aqueous system is a cooling water system, a recirculating water system, a boiler water system, a desalinization unit, or a gas scrubber.

6. A process according to claim 5 wherein the aqueous system is steam generating boiler.

7. A process according to claim 5 wherein the aqueous system is a cooling water system having an operating temperature in the range of 60° F. to 200° F.

* * * * *